US006666688B1

United States Patent
Goeckel

(10) Patent No.: US 6,666,688 B1
(45) Date of Patent: Dec. 23, 2003

(54) LIQUID MEASUREMENT TEACHING AID

(76) Inventor: Lyn H. Goeckel, 29 Planters Dr., Lilburn, GA (US) 30047

( * ) Notice: Subject to any disclaimer, the term of this patent is extended or adjusted under 35 U.S.C. 154(b) by 0 days.

(21) Appl. No.: 10/266,777

(22) Filed: Oct. 8, 2002

(51) Int. Cl.[7] .......................... G09B 25/00; G09B 1/00; B65D 21/00
(52) U.S. Cl. ...................... 434/365; 434/188; 434/195; 434/433; 220/23.4; 446/69; 446/74; 446/71
(58) Field of Search .............................. 446/74, 73, 76, 446/69; 434/188, 433, 195, 211, 365; 220/23.4, 23.86

(56) References Cited

U.S. PATENT DOCUMENTS

| 595,455 | A | * | 12/1897 | Glidden | ...................... 434/213 |
| 3,658,204 | A | * | 4/1972 | Bottger | ...................... 220/23.4 |
| 4,731,022 | A | * | 3/1988 | Garland | ...................... 434/194 |
| 5,318,787 | A | * | 6/1994 | Brauner et al. | .............. 426/120 |
| 6,206,218 | B1 | * | 3/2001 | Young et al. | ............... 220/23.4 |

OTHER PUBLICATIONS

Description of "Mr. Gallon" used for the past 34 years.*
Mini Lesson by Natalie Roberts Nov. 3, 1997.*
Elementary Mathematics–Science SMILE Meeting by Porter Johnson, May 8, 2001.*
EAI Spring 2001 catalog p. 52.*

* cited by examiner

Primary Examiner—Derris H. Banks
Assistant Examiner—Dmitry Suhol
(74) Attorney, Agent, or Firm—Thomas, Kayden, Horstemeyer & Risley, LLP

(57) ABSTRACT

A teaching aid is disclosed herein that includes at least one gallon model, four quart models, two pint models, and two cup models. The appropriate measurement is attached to each model, thus showing a student how many of each measurement are in each model. A method for teaching students is also disclosed herein, using the teaching aid and the associated models.

8 Claims, 2 Drawing Sheets

LIQUID MEASUREMENT TEACHING AID

FIELD OF THE INVENTION

The present invention is generally related to teaching aids and, more particularly, is related to liquid measurement teaching aids.

DESCRIPTION OF THE RELATED ART

It is desirable for young children and individuals that are mentally challenged, to learn information about spatial relationships and measurements and, in particular, about liquid measurements. Such knowledge is useful in cooking and grocery and reading recipes.

Teaching dimensional relationships to groups of students, such as in a classroom environment, often has created difficulties, both from the instructor's ability to easily demonstrate visually the information he or she is attempting to convey, and the ability of the student to see and understand such visual information. Hitherto, education about liquid measurements has been conducted by means of lecture or explanation assisted by reference to printed literature, slides, videos, charts and posters, sometimes assisted by use of white or blackboards and the like.

The prior art teaching aids suffer from a number of disadvantages. "Talk and chalk" methods and those referring to illustrative diagrams are not effective to convey the relationship between various sizes and shapes of standard liquid measurements. In addition, known teaching aids may not readily arrest attention, especially of children, for a sufficiently long span of time. Moreover, such models are of little assistance in relating the liquid measurements to a real-life example of how such measurement would be used.

Thus, a heretofore unaddressed need exists in the industry to address the aforementioned and/or other deficiencies and inadequacies.

SUMMARY OF THE INVENTION

The present invention provides an apparatus and method for facilitating the teaching of students about liquid measurements. Briefly described, one embodiment of the system, among others, includes a model of a liquid gallon container, the gallon model comprising a front and a back; four models of a liquid quart container affixed to said gallon model, at least one of the quart models comprising a front and a back; at least two models of a liquid pint container affixed to at least one quart model, at least one of the pint models comprising a front and a back; and two models of a liquid cup container affixed to the back of said pint model.

The present invention can also be viewed as providing methods for teaching students, particularly about liquid measurements and relating it to a real-life example. In this regard, one embodiment of such a method, among others, can be broadly summarized by the steps of using a teaching aid, wherein the teaching aid includes the models described above.

The present invention has numerous advantages, a few of which are delineated hereafter as mere examples. The teaching aid is large enough to be seen by a group of students, and the models are configured in such a way that the students can relate the liquid measurements to objects that they see everyday, e.g., a gallon jug and quart-sized carton. Additionally, by directly relating the physical models to each other, students are able to more easily grasp the idea of how measurements relate to each other.

Other advantages of the invention are that it is simple in design, user friendly, robust and reliable during use, and easily implemented for mass commercial production. Clearly, some embodiments of the invention may exhibit advantages in addition to or lieu of, those mentioned above. Additionally, other methods, features, and advantages of the present invention will be or become apparent to one with skill in the art upon examination of the following drawings and detailed description. It is intended that all such additional methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention includes a teaching aid and a method for facilitating the teaching of students about liquid measurements. In particular, the teaching aid relates liquid measurements, by using models of everyday use, to common liquid measurements. Reference will now be made to the drawings.

Figure 1A:
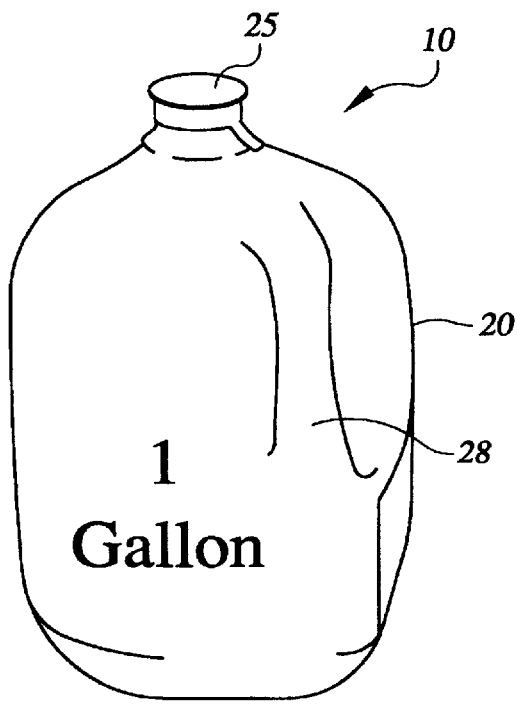
FIG. 1A is a front side view of an embodiment of the gallon model of the present invention.

In FIG. 1A, depicted is the front side of a teaching aid 10, which includes a gallon model 20. The gallon model 20 may be any two- or three-dimensional representation of a conventional one gallon milk container. Preferably, the gallon model 20 is a relatively flat, two-dimensional depiction or a thin representation of an actual gallon milk container. The gallon model 20 may be made of any material known in the demonstration art, including paper, construction paper, felt, felt paper, "white board" material, chalkboard material, and, preferably, a corrugated-type material to which permanent ink can be inscribed thereon. The one gallon model 20 may be decorated with, for example, a red felt cap 25 and a cut-out that forms a handle 28. Such additional features of the gallon model 20 may aid in the graphical presentation of the teaching aid 10, which would further the interest of a student. The gallon model 20 may have either the phrase "1 Gallon" or term "Gallon" written or embossed to the front of the model 20, as shown in FIG. 1A.

Figure 1B:
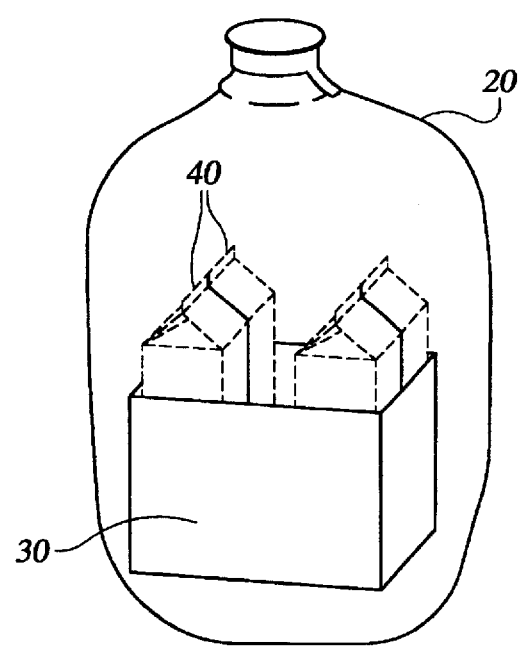
FIG. 1B is a back side view of an embodiment of the gallon model of FIG. 1A.

FIG. 1B is a back side view of the gallon model 20. Affixed to the back side of gallon model 20 are four quart models 40. The quart models 40 may be attached to the gallon model 20 in any manner of methods, such as by a fastener, or a pocket 30, as shown in FIG. 1B. If the quart models 40 are attached to the back of the gallon model 20 by a fastener, the fastener may be any fastening device known in the art, such as for example, but not limited to, a magnet, a hook, a latch, a nail, a pin, a thumb tack, a prong paper fastener (e.g., a brad), a paper clip, or a screw. Additionally, the quart model 40 may be affixed to the gallon model 20 via any type of mounting agent such as an adhesive or a hook and loop fastener. Thus, it should be clear to a student from the teaching aid 10 that every gallon container contains four quarts of a liquid.

Figure 2A:
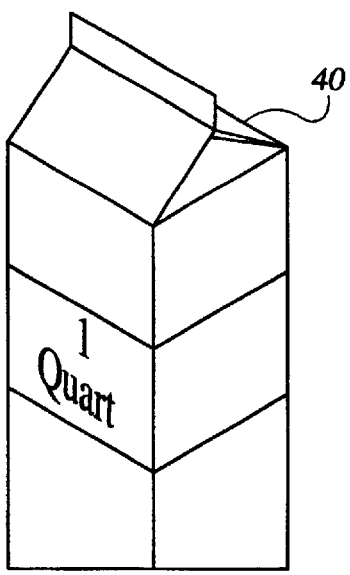
FIG. 2A is a front side view of an embodiment of the quart model of the present invention.

FIG. 2A is a front view of one of the quart models 40. In a preferred embodiment, the quart model 40 has the phrase "1 Quart" or the term "Quart" written or embossed on front. The phrase may be written in ink, or with cut-outs of a different type of material than the material from which the quart model 40 is made, or a different color from which the quart model 40 is made, so that the phrase stands out from the quart model 40. Again, the quart model 40 may be any material that could be envisioned by one skilled in the area of art, such as for example, a magnet, a hook, a latch, a nail, a pin, a thumb tack, a prong paper fastener (e.g., a brad), a paper clip, or a screw.

Figure 2B:
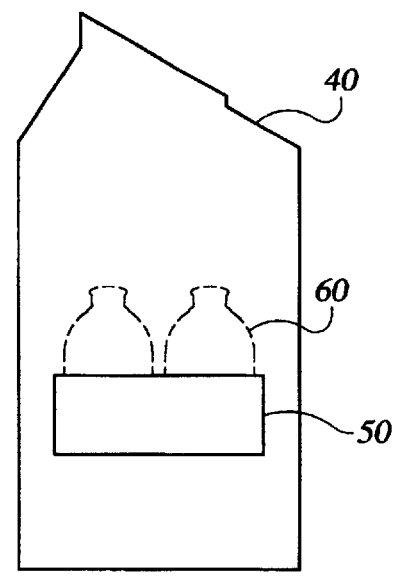
FIG. 2B is a back side view of an embodiment of the quart model of FIG. 2A.

FIG. 2B depicts the back side of one of the quart models 40. Similar to the one gallon model 20, the quart model 40 has affixed to the back thereof the next smallest size of measurement, in the form of two pint models 60. Similar to the one gallon model 20, the quart model 40 has the pint model 60 affixed thereto via a fastener, adhesive, hook and loop material, or a pocket 50, for example, as shown in FIG. 2B. Similar to the other models, the pint models 60 have either the phrase "1 Pint" or the term "Pint" either written on the model 60, affixed thereto, or embossed thereon.

Figure 3:
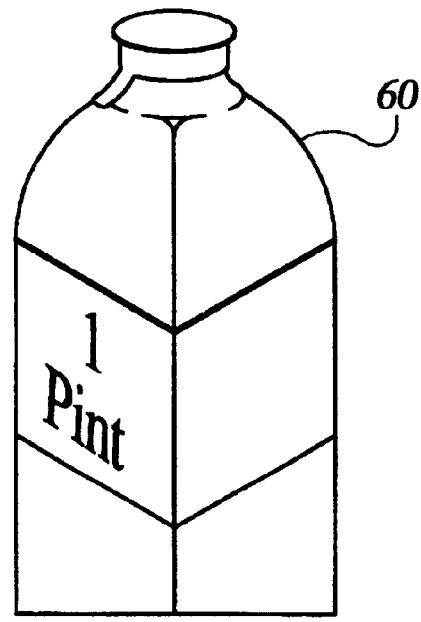
FIG. 3 is a front side view of an embodiment of the pint model of the present invention.

FIG. 3 shows a representation of what the pint model 60 may look like. The pint bottle 60 is designed to represent old-fashioned pint glass, pint milk jugs, or plastic pint milk jugs currently commercially available with a plastic screw-top lid. The pint model 60 may be made of any material such as that of the gallon model 20 or the quart model 40. Thus, it should be clear from any one of the quart models 40 that every quart contains two pints of liquid. In an preferred embodiment, each of the four quart models 40 contains two pint models 60 affixed thereto.

Figure 4:
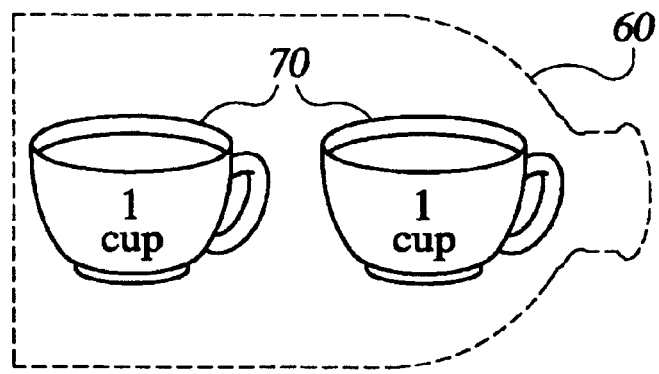
FIG. 4 is a front side view of an embodiment of the cup models of the present invention, as they relate to the pint model of FIG. 3.

FIG. 4 is an depiction of the back side of an exemplary pint model 60. As can be seen from FIG. 4, the pint model 60 may have affixed thereto, two one-cup models 70. The cup model 70 may be drawn on the back of the pint model 60, or the cup model 70 may be separate models 30 that are affixed to the back of the pint model 60. If the cup model 70 is a separate piece attached to the pint model 60, then the cup model 70 may be made of any material that the gallon model 20, the quart model 40, or the pint model 60 may be made of. Similar to the other models, the cup models 70 have either the phrase "1 Cup" or "Cup" either written on the model, affixed thereto, or embossed thereon. Thus, it should be evident to a student to which the teaching aid is shown that each pint contains two cups of a liquid.

Optionally, the teaching aid 10 may be in the form of three-dimensional models, that are configured substantially to scale of actual one-gallon containers, quart liquid containers, pint liquid containers and one-cup serving containers. Thus, the gallon model 20 may resemble an actual one-gallon milk container, and have disposed therein four quart models 40 that resemble one-quart liquid containers. The quart models 40 may be accessed within the gallon model 20 by a door or other similar mechanism. Similarly, at least one quart model 40 may have disposed therein two pint models 60. The pint models 60 may have disposed therein two cup models 70.

The present invention is also directed to a method of teaching students. The method of teaching students includes using the teaching aid 10 described and shown herein. In a preferred embodiment, a teacher holds up the front side of gallon model 20 (FIG. 1A) to students and tells them that it depicts one gallon. Then, the teacher turns over the gallon model 20 and shows the students how the one gallon model 20 contains the four quart models 40. Next, the teacher removes at least one of the quart models 40 (FIG. 2A), and turns it over and shows the student how each quart model 40 contains two pint models 60 (FIG. 2B). Finally, the teacher can remove one of the pint models 60 (FIG. 3) and show the students, by turning over the pint model 60, how each pint model 60 contains two cups of as liquid (FIG. 4).

Alternatively, the method of using the teaching aid may include a self-teaching method, where the student handles the teaching aid 10, and learns about the liquid measurements by himself or herself. The method may include a student holding the one gallon model 20; the student turning over the gallon model 20 and seeing that the one gallon model 20 contains the four quart models 40; the student removing at least one of the quart models 40; the student turning over one of the quart models 40; the student seeing how the quart model 40 contains the two pint models 60; the student removing one of the pint models 60; and the student seeing, by turning over the pint model 60, how the pint model 60 contains the two cup models 70.

By using liquid containers that students and small children would be familiar with (e.g., a gallon milk container, a quart liquid container, or coffee cups), the students are able to relate measurements, that may have been previously esoteric, to something in their everyday lives. For students that learn better by visual methods, the teaching aid 10 creates an impression in a student's mind that he or she can later visualize, even when the model 10 is not available. Because the teaching aid 10, and all of the models associated therewith, may be made of materials that are sturdy, the teaching aid 10 may be passed around to the students so that they can see and handle the models themselves, and pull each of the models out and also learn by tactile stimulation. Accordingly, the present invention includes both the teaching aid 10 and a method of teaching students about liquid measurements that has not been known or provided heretofore in the art.

It should be emphasized that the above-described embodiments of the present invention are merely possible examples of implementations, and are merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A teaching aid to facilitate the teaching of students about liquid measurements, comprising:

a gallon model of a liquid gallon container, the gallon model comprising a front, and a back;

four quart models of a liquid quart container removably affixed to said back of said gallon model, wherein said four quart models are positioned to be contained within an area of said back of said gallon model, at least one of the quart models comprising
  a front, and
  a back;
at least two pint models of a liquid pint container removably affixed to said back of at least one quart model, wherein said at least two pint models are positioned to be contained within an area of said back of said at least one quart model, at least one of the at least two pint models comprising
  a front, and
  a back; and
two cup models of a liquid cup container removably affixed to the back of one of said at least two pint models wherein the two cup models are positioned to be contained within an area of said back of said one of said at least two pint models.

2. The teaching aid of claim 1, wherein the models are thin representations.

3. The teaching aid of claim 1, wherein the gallon model, quart model, pint model, and cup models are three-dimensional models that are configured to be respective each other to scale.

4. The teaching aid of claim 1, wherein the gallon model, quart model, pint model, and cup models are affixed via being disposed in a pocket attached to the back of the models.

5. The teaching aid of claim 1, wherein the gallon model, quart model, pint model, and cup models are affixed via a fastener.

6. The teaching aid of claim 5, wherein the fastener is at least one of the following: a magnet, a hook, a latch, a nail, a pin, a thumbtack, a prong paper fastener, a paper clip and a screw.

7. The teaching aid of claim 1, wherein the models are affixed via a mounting agent.

8. The teaching aid of claim 7, wherein the mounting agent is chosen from an adhesive and a hook and loop fastener.

* * * * *